(12) United States Patent
Chaiko et al.

(10) Patent No.: US 7,135,508 B2
(45) Date of Patent: *Nov. 14, 2006

(54) COATINGS AND FILMS DERIVED FROM CLAY/WAX NANOCOMPOSITES

(75) Inventors: David J. Chaiko, Naperville, IL (US); Argentina A. Leyva, Bolingbrook, IL (US)

(73) Assignee: The University of Chicago, Chicago, IL (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/371,214

(22) Filed: Feb. 20, 2003

(65) Prior Publication Data

US 2003/0187120 A1    Oct. 2, 2003

Related U.S. Application Data

(63) Continuation of application No. 10/100,381, filed on Mar. 18, 2002, now Pat. No. 6,790,896, and a continuation-in-part of application No. 10/078,992, filed on Feb. 20, 2002, now Pat. No. 6,822,035.

(51) Int. Cl.
*C08K 9/04* (2006.01)
*C08K 3/34* (2006.01)

(52) U.S. Cl. ............... 523/216; 524/275; 524/277; 524/185; 524/445; 524/447; 977/DIG. 1

(58) Field of Classification Search ......... 524/445, 524/447, 275, 277, 186; 501/145; 523/216
See application file for complete search history.

(56) References Cited

U.S. PATENT DOCUMENTS

| | | |
|---|---|---|
| 3,977,894 A | 8/1976 | White et al. |
| 4,412,018 A | 10/1983 | Finlayson et al. |
| 4,434,075 A | 2/1984 | Mardis et al. |
| 4,435,217 A | 3/1984 | House |
| 4,517,112 A | 5/1985 | Mardis et al. |
| 4,810,734 A | 3/1989 | Kawasumi et al. |
| 4,816,517 A * | 3/1989 | Wilkus et al. ............. 525/194 |
| 5,552,469 A | 9/1996 | Beall et al. |
| 5,554,670 A | 9/1996 | Giannelis et al. |
| 5,582,638 A | 12/1996 | Coutelle et al. |
| 5,645,758 A | 7/1997 | Kawasumi et al. |
| 5,698,624 A | 12/1997 | Beall et al. |
| 5,726,247 A | 3/1998 | Michalczyk et al. |
| 5,747,560 A | 5/1998 | Christiani et al. |
| 5,837,763 A | 11/1998 | Ferraro et al. |
| 5,840,796 A | 11/1998 | Badesha et al. |
| 5,876,812 A | 3/1999 | Frisk et al. |
| 5,910,523 A | 6/1999 | Hudson |
| 5,962,553 A | 10/1999 | Ellsworth |
| 6,034,163 A | 3/2000 | Barbee et al. |
| 6,036,765 A | 3/2000 | Farrow et al. |
| 6,043,300 A | 3/2000 | Santhanam |
| 6,060,549 A | 5/2000 | Li et al. |
| 6,084,019 A | 7/2000 | Matayabas, Jr. et al. |
| 6,103,817 A | 8/2000 | Usuki et al. |
| 6,136,908 A | 10/2000 | Liao et al. |
| 6,156,835 A | 12/2000 | Anderson et al. |
| 6,172,121 B1 | 1/2001 | Chaiko |
| 6,225,374 B1 | 5/2001 | Vaia et al. |
| 6,262,162 B1 | 7/2001 | Lan et al. |
| 6,271,297 B1 | 8/2001 | Ishida |
| 6,271,298 B1 | 8/2001 | Powell |
| 6,380,295 B1 | 4/2002 | Ross et al. |
| 6,407,155 B1 | 6/2002 | Qian et al. |
| 6,521,678 B1 | 2/2003 | Chaiko |
| 6,632,868 B1 * | 10/2003 | Qian et al. .............. 524/445 |
| 6,759,463 B1 | 7/2004 | Lorah et al. |
| 6,790,896 B1 * | 9/2004 | Chaiko .................. 524/445 |
| 6,822,035 B1 * | 11/2004 | Chaiko .................. 524/445 |
| 6,841,226 B1 * | 1/2005 | Dontula et al. .......... 428/195.1 |
| 6,864,308 B1 * | 3/2005 | Rosenthal et al. .......... 524/445 |

OTHER PUBLICATIONS

Jordan, John W., "Organophilic Bentonites," *J. Phys. Colloid Chem.*, vol. 53, pp. 294-306, 1949, published by Baltimore, Williams & Wilkins Co.

Kawasumi, M., et al., "Liquid Crystalline Composite Based on a Clay Mineral," *Mol. Cryst. Liq. Cryst.*, vol. 281, pp. 91-103, 1996, published by Gordon and Breach Science Publishers SA, printed in Malaysia.

Kawasumi, M., et al., "Preparation and Mechanical Properties of Polypropylene—Clay Hybrids," *Macromolecules*, vol. 30, pp. 6333-6338, 1997, published by American Chemical Society.

Hasegawa, N., et al., "Preparation and Mechanical Properties of Polypropylene-Clay Hybrids Using a Maleic Anhydride-Modified Polypropylene Oligomer," *J. Appl. Poly. Sci.*, vol. 67, pp. 87-92, 1998, published by John Wiley & Sons, Inc.

* cited by examiner

*Primary Examiner*—Tae H. Yoon
(74) *Attorney, Agent, or Firm*—Foley & Lardner LLP

(57) ABSTRACT

The invention provides methods for making clay/wax nanocomposites and coatings and films of same with improved chemical resistance and gas barrier properties. The invention further provides methods for making and using emulsions of such clay/wax nanocomposites. Typically, an organophillic clay is combined with a wax or wax/polymer blend such that the cohesion energy of the clay matches that of the wax or wax/polymer blend. Suitable organophilic clays include mica and phyllosilicates that have been surface-treated with edge or edge and surface modifying agents. The resulting nanocomposites have applications as industrial coatings and in protective packaging.

33 Claims, 7 Drawing Sheets

COATINGS AND FILMS DERIVED FROM CLAY/WAX NANOCOMPOSITES

RELATED APPLICATIONS

This application is a continuation-in-part of U.S. patent application Ser. No. 10/078,992, filed on Feb. 20, 2002, now U.S. Pat. No. 6,822,035, and of U.S. patent application Ser. No. 10/100,381, filed on Mar. 18, 2002, now U.S. Pat. No. 6,790,896.

STATEMENT REGARDING FEDERALLY SPONSORED RESEARCH

The United States Government has rights in this invention pursuant to Contract No. W-31-109-ENG-38 between the United States Department of Energy and the University of Chicago representing Argonne National Laboratory.

FIELD OF THE INVENTION

This invention relates to waxes and wax emulsions containing organically modified phyllosilicates and methods for producing the same. More specifically, the present invention relates to waxes and both oil-based and water-based wax emulsions with improved gas barrier and chemical resistance for application onto metal, plastic, and paper surfaces.

BACKGROUND OF THE INVENTION

The incorporation of phyllosilicate fillers in polymer films is used to enhance mechanical properties, heat resistance, and enhance barrier properties. Other properties improved with fillers include improved chemical resistance, electrical resistance, and flame retardancy. Since the late 1980s a great deal of research around the world has focused on methods to incorporate fully exfoliated smectite clays, primarily montmorillonite due to its extremely high aspect ratio, into a variety of thermoset and thermoplastic polymers.

Thermoplastic polymers such as polyethylene are used in flexible packaging applications because of its high resistance to the diffusion of water vapor and other polar molecules. When applied to a paper substrate the polymer film provides strength, and improved barrier properties. However, laminate structures such as these are difficult to recycle due to the tight bond between the polymer and the paper substrate. Alternative approaches include the use of wax coatings to impart water barrier resistance, especially water vapor, and still maintain recyclability. Unfortunately, wax coatings are poor barriers to nonpolar gases like oxygen and carbon dioxide, and the wax surfaces have a tendency to be slippery.

Because their surfaces are hydrophilic, the smectite clays must be surface-treated to render them compatible with olefinic materials. The approach that has most often been used is based on the technology utilized for the last fifty years to make organoclays as rheological control agents in paints, inks, greases, etc. This approach utilizes quaternary amine-based surfactants to render the basal surface of the clay compatible with the olefinic matrix. Various high-molecular-weight quaternary ammonium salts have been used such as dimethyl dihydrogenated tallow ammonium chloride, dimethyl benzyl hydrogenated tallow ammonium chloride, and methyl benzyl dihydrogenated tallow ammonium chloride. Other onium ions that have been used include the phosphonium and sulfonium groups. Surprisingly, this approach has not been very successful in promoting clay exfoliation in olefinic polymers such as polyethylene and polypropylene and their copolymers.

Methods of producing organoclays that incorporate high-molecular-weight hydrotropes on the basal surface and an edge modifying surfactant adsorbed along its edges to render the clay platelets edges organophilic, yield organoclays which readily disperse in polyolefin systems.

Wax nanocomposites have many potential applications in paper packaging like increasing barrier properties (i.e., oxygen and moisture vapor transmission, oil and grease resistance, water resistance), increasing strength, increasing coefficient of friction, increasing block resistance, and increasing printability. With improved barrier capabilities and chemical resistance, wax nanocomposites could find use as industrial coatings and protective packaging, corrugated containers (i.e., meat, cheese and poultry packaging, flower shipping boxes), coated folding cartons (i.e., detergent boxes, dairy and bakery products, frozen food, pet food), bags and wrapping papers (i.e., fast foods, microwave packaging, pet foods, cement bags), industrial packaging (i.e., ream wrap, roll wrappers, beverage carriers), and liquid packaging (milk; juice, oil). The problem of recycling polymer-laminated paper is solved by using wax-based, emulsion nanocomposites in place of extruded polymer films. In addition, the coating speed of emulsion systems is considerably faster than polymer extrusion coating thereby reducing manufacturing costs.

Prior art has focused on the incorporation of nanoclays into waxes for improvement of various properties including reduced shrinkage and cracking of the wax when it is cooled from the melt and increasing melt viscosity. There is however, no evidence in the scientific literature to suggest that the incorporation of organoclays into waxes would lead to increased barrier properties of wax films and no mention of this application is found in prior art. This is consistent with polyolefin systems, where there is also no prior art demonstrating improved barrier performance in polyolefin nanocomposites. This is puzzling since the exfoliation of an organoclay is generally expected to reduce gas permeability by virtue of increasing diffusion path length. Because the clay crystal lattice is impermeable, anisotropic orientation of the clay platelets would lead to a tortuous diffusion path. In fact, the addition of organoclays, according to prior art, actually results in a decrease of barrier properties.

Thus a need exists for a method of improving the barrier properties and chemical resistance of wax and wax/polymer coatings while at the same time improving certain physical attributes such as surface friction and maintaining flexibility.

SUMMARY OF THE INVENTION

The present invention provides methods to prepare wax/organoclay nanocomposites and aqueous emulsions thereof. The present invention also provides for the preparation of nanocomposites in wax/polymer blends. There are further provided methods for coating substrates with invention nanocomposites and the articles thereby produced. The preparation of these nanocomposites involves the use of organoclays that are capable of exfoliation in olefin materials. Typically, organoclays useful in the present invention are surface treated with a high-molecular-weight hydrotrope and/or an edge modifying surfactant to render the clay surface organophilic. Suitable clays include phyllosilicates that are able to undergo ion-exchange, such as smectite clay or mica. Natural or synthetic clays may be used in the present invention.

Thus, the present invention provides a method of preparing a nanocomposite comprising combining an organophilic clay and a melt of a wax or a wax and polymer, wherein the cohesion energies of the organophilic clay and the wax or wax and polymer are sufficiently matched in both the melt and solid states to produce and maintain a homogenous dispersion of the organophilic clay in both the liquid and solid nanocomposite. The resulting nanocomposites have improved barrier properties compared to the wax or wax/polymer blend alone.

In one embodiment, the method of the present invention employs a surface-treated clay such as one including a nonionic polymeric hydrotrope adsorbed onto a basal surface thereof, and/or an edge modifying surfactant adsorbed onto an edge thereof. The process used to produce hydrotrope-modified organoclays is described in detail in U.S. patent application Ser. No. 10/078,992, filed on Feb. 20, 2002, now U.S. Pat. No. 6,822,035. The process used to make organoclays incorporating both basal surface modification with a hydrotrope and edge treatment is described in detail in U.S. patent application Ser. No. 10/100,381, filed on Mar. 18, 2002, now U.S. Pat. No. 6,790,896.

In some such embodiments, the invention further comprises filtration and washing of the clay following surface treatment to produce an organoclay filter cake containing approximately 20 to 65 weight percent solids. The solids concentration in the filter cake will depend on the surface treatment applied to the ion-exchangeable clay. The organoclay filter cake is added to the wax melt with sufficient shear to produce a nanocomposite. The wax used can be a natural or synthetic wax. Examples of natural waxes include, but are not limited to, paraffin, microcrystalline montan, and vegetable waxes. Examples of synthetic waxes include, but are not limited to, Fisher-Tropsch, polyethylene, polypropylene, polymethylene, chemically modified waxes, and polymerized alpha-olefins.

Various processes may be used to combine the organophilic clay and the wax. By way of nonlimiting example, the wax/organoclay nanocomposites may be prepared by melting the wax in a vessel by heating it to at least the melting point of the wax and then adding the filter cake while mixing. The heat and the mixing of such processes will eliminate the water by flushing and evaporation. Alternatively, the wax and the filter cake may be mixed in a vessel at a pressure below or above atmospheric pressure. For example, the organophillic clay and wax may be combined in an extruder operated at a temperature of 100 to 130° C. where the water vapor is removed either by pulling a vacuum in the extruder, or by pressurizing the extruder and removing the water by gravity as a liquid phase.

In another embodiment, the present method further comprises adding the wax melt to the organoclay slurry prior to filtration and formation of the filter cake. In cases where the melting point of the wax is above the boiling point of the organoclay slurry, the wax melt is added under pressure to a stirred pressure vessel. The pressure vessel may be held under an inert gas, such as nitrogen, where there is concern for oxidation of the organoclay surface or the wax. To conserve heat, the bulk of the water may be removed as a liquid phase. The remaining water can be removed from the organoclay by evaporation. The amount of wax added to the organoclay can vary from about 1 weight percent to about 95–99 weight percent, and is typically about 45–60 weight percent. The preparations with high organoclay concentrations can be further diluted with additional wax or blended with a polymer to produce a wax/polymer nanocomposite.

In yet another embodiment, the wax nanocomposite can be further processed to prepare a water-based emulsion. The emulsion is prepared by adding the wax/organoclay nanocomposite melt to a stirred aqueous phase containing appropriate surfactants to stabilize the wax nanocomposite droplets. The addition of the wax melt to the water will result in an oil-in-water emulsion that has a creamy consistency and a viscosity appropriate for surface coating. The emulsion stabilizer can be prepared prior to emulsion formation or in situ during emulsion formation by adding a relatively strong base to a relatively weak organic acid. Examples of bases used in the preparation of the emulsion stabilizer include, but are not limited to, potassium hydroxide, ammonia and amine compounds. Examples of weak acids used in the preparation of the emulsion stabilizer include, but are not limited to, carboxylic acids.

The resulting emulsion can be applied to substrates to provide articles with improved barrier properties toward gases, water, water vapor, volatile organic chemicals (VOCs), and resistance to chemicals. The emulsion can also improve mechanical properties of the substrate, such as tear, scratch and puncture resistance, and tensile strength. Examples of substrates include, but are not limited to, paper, cardboard, aluminum foil, polyethylene, polypropylene, poly(ethylene terephthalate) (PET), etc. The emulsion can be applied to the surface of the substrates by a variety of available coating techniques. Examples of coating techniques include, but are not limited to, blade coating, rod coating, roll coating, jet coating, spray coating, air knife coating, pond size press, and film size press.

As noted above, wax nanocomposites or wax/polymer hybrids of the present invention are expected to be useful in a variety of paper packaging applications. In addition, the low viscosity and low melting temperatures of invention clay/wax and clay/wax/polymer nanocomposites provide low cost, high speed coating alternatives to the extrusion coating of polymers like polyethylene and nylon. These and other advantages will become readily apparent from the following detailed descriptions and drawings.

DETAILED DESCRIPTION OF THE INVENTION

Figure 1:
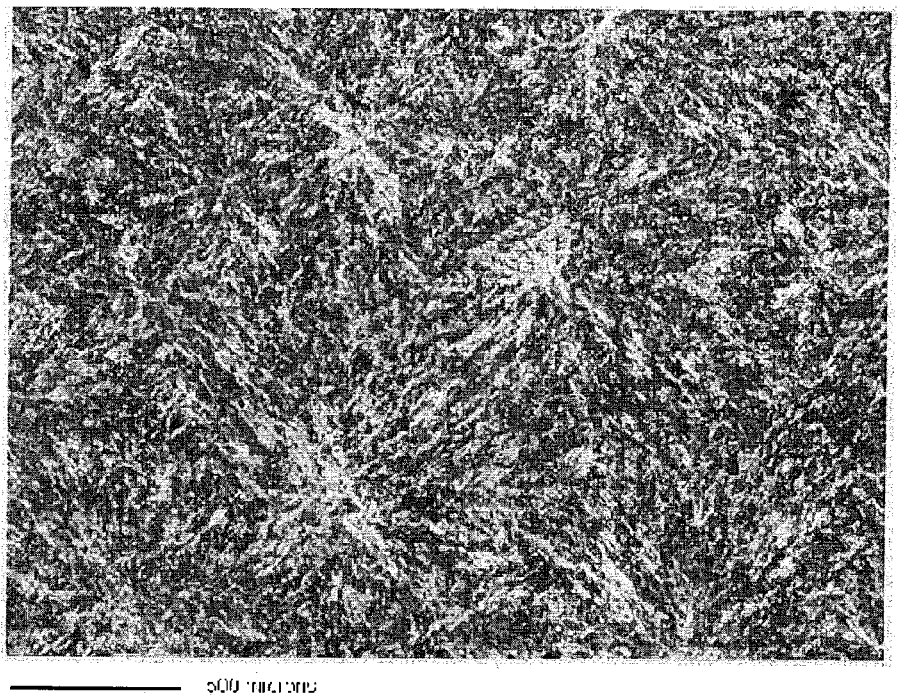
FIG. 1. Polarized light micrograph of clay/wax nanocomposite containing 5 weight percent organoclay.

The present invention provides organoclay/wax nanocomposites and emulsions thereof having improved barrier properties and methods for making the same. The present invention further provides methods for producing coatings and films employing invention nanocomposites and articles containing the same. More specifically, the invention permits the preparation of organoclay/wax nanocomposites with improved barrier properties that are explained by simple tortuosity effects.

The present invention provides for the preparation of wax nanocomposites wherein the organophilic clay is homogeneously dispersed throughout the wax matrix. Such nanocomposites exhibit superior dispersion stability such that the organoclay remains dispersed in the quiescent melt over extended periods of time. Invention methods also maintain the homogenous dispersion as the wax cools to a semi-crystalline solid. Furthermore, the dispersion stability is unaffected by the addition of surfactants for the purpose of emulsifying the wax nanocomposite in water-based systems.

Other additives such as antioxidants, anticorrosion agents, reactive scavengers, such as colloidal metal oxides for improved acid barrier capabilities, oxygen scavengers for improved oxygen barrier capabilities, UV stabilizers, and colorants such as dyes and pigments may be incorporated into the compositions by admixing with the wax nanocomposite or by incorporating the additives directly onto the organoclay surface. For example, organoclays may be combined with water soluble dyes and then dispersed in waxes or polyolefins. In this unique application, the organoclays aid the dispersion of the dyes even though water-soluble dyes would not be expected to be dispersible in polyolefins.

The nanocomposite materials may also be crosslinked to improve mechanical strength and barrier properties by incorporating organic peroxides and reacting at the appropriate temperature to effect the cross linking reaction between the hydrocarbon chains. Typical organic peroxides include dicumyl peroxide, tert-butylcumyl peroxide, 1,3-1,4 bis(tert-butylperoxideisopropyl) benzene, 2,5 dimethyl 2,5 di(tert-butylperoxyl) hexyne, 2,5 dimethyl 2,5 di(tert-butylperoxyl) hexane, n-butyl-4,4'-di(tert-butylperoxy)valerate, 1,1'-di(tert-butylperoxy)-3,3,5-trimethylcyclohexane, diacylperoxide.

The present invention also encompasses embodiments wherein the organoclay has been modified on its basal surfaces with nonionic polymeric hydrotropes and on its edges with anionic surfactants that include organophosphorous and organosulfur compounds. The process used to produce hydrotrope-modified organoclays is described in detail in U.S. patent application Ser. No. 10/078,992, filed on Feb. 20, 2002, now U.S. Pat. No. 6,822,035, and U.S. patent application Ser. No. 10/100,381, filed on Mar. 18, 2002, now U.S. Pat. No. 6,790,896, Both applications are herein incorporated by reference in their entirety. Briefly, adsorption of a polymeric hydrotrope on the basal surface of an edge modified clay is achieved by dispersing and/or dissolving a polymeric hydrotrope in the clay dispersion and allowing the hydrotrope to adsorb onto the surface of the dispersed, edge modified clay. The edge modification of the dispersed clay is carried out using an appropriate organic surfactant modifier.

Suitable organic surfactant edge modifiers for use in the present invention include organophosphorous and organosulfur compounds, particularly the following:

a) phosphonic acids with the formula

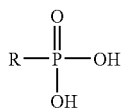

b) phosphonic acids with the formula

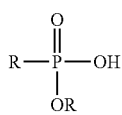

c) phosphinic acids with the formula

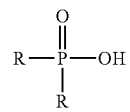

d) phosphoric acid esters with the formula

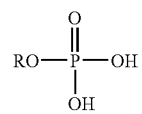

e) phosphoric acid diesters with the formula

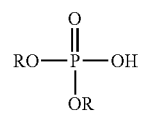

f) phosphorous acid diesters with the formula

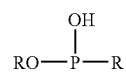

g) diphosphonic acids with the formula

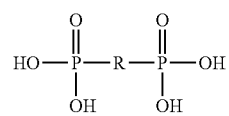

h) pyrophosphoric acid diesters with the formula

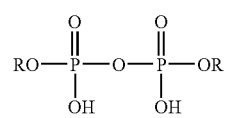

i) thiophosphonic acids with the formula

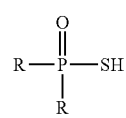

j) dithiophosphonic acids with the formula

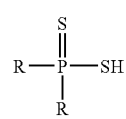

where R is an alkyl or hydroxyalkyl group with 1 to 50 carbon atoms or an aryl or hydroxyaryl group with 6 to 12 carbon atoms. Additionally, the R group may include oligomers comprised of two or more chemical species. Nonlimiting examples include polyethylene/poly(ethylene glycol), polyethylene/polypropylene, poly(dimethylsiloxane)/poly(alkylmethylsiloxane), polyethylene/polybutylene, polyethylene/polybutene, polypropylene/polybutene, polystyrene/polybutadiene.

Suitable nonionic polymeric hydrotropes include, but are not limited to, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, and mixtures thereof.

Other nonlimiting examples of polymeric hydrotropes include polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

In some embodiments where the surface treated clay has been modified on both basal surfaces and edges, the melt comprises about 1–99 weight percent of the nanocomposite. In some other embodiments, the surface treated clay comprises about 1–15 weight percent and preferably about 3–10 weight percent of the nanocomposite.

The clay is also subject to cation exchange using a cationic surfactant, as described below. Cation exchange may take place after hydrotrope adsorption has occurred or as hydrotrope adsorption is occurring. In this latter embodiment, the clay is exposed to a solution containing a mixture of a polymeric hydrotrope and a cationic surfactant. This process produces a preactivated organoclay that can be dispersed in solvents, waxes, and polymers without additional activators, coupling agents or compatabilizers as is the case with conventional organoclays, resulting in a significant reduction in the total organic loading of the organoclay. This has the advantage of making it possible to produce organoclays especially useful in the preparation of composite materials at a greatly reduced cost.

In various embodiments wherein the phyllosilicates are subject to cation exchange, the phyllosilicates are exposed to enough cationic surfactant to approximately satisfy the cationic exchange capacity of the phyllosilicates but not enough to complex all of anionic edge modifier. For dispersions in aliphatic solvents and polyolefins, the amount of cation in the dispersion should be enough to satisfy between about 50 and 100 percent of the cation exchange capacity of the phyllosilicates. This includes embodiments where the amount of cation is sufficient to satisfy between about 75 and 100 percent of the exchange capacity of the phyllosilicate. This has two advantages. First, it substantially eliminates excess cationic surfactant which is only loosely bound to the phyllosilicate surface and easily separates during processing and composite material formation, degrading the quality of the composite materials. Second, it prevents the anionic edge modifiers from complexing with all of the cationic surfactants, leaving at least some of the edge modifiers free to adsorb onto the phyllosilicate edges.

Suitable clays for use in the invention include phyllosilicate clays, such as mica and smectite clays. Exemplary smectite clays include montmorillonite, hectorite, saponite, sauconite, beidellite, nontronite and synthetic smectites such as Laponite®. As will be well understood by one skilled in the art, the clays discussed herein inherently have basal surfaces and are arranged in layers of particles which are stacked on top of one another. The stacking of the clay platelets provides interlayers, or galleries, between the clay layers. These galleries are normally occupied by cations, typically comprising sodium, potassium, calcium, magnesium ions and combinations thereof, that balance the charge deficiency generated by the isomorphous substitution within the clay layers. Typically, water is also present in the galleries and tends to associate with the cations. The distance between the basal surfaces of adjacent clay layers is referred to as the basal spacing.

In one aspect of the present invention, the edge modified organoclay is blended with a natural or synthetic semi-crystalline wax, rather than being exposed to a polymeric hydrotrope activator in a dispersion, to form a master batch. Thus, the wax acts as a hydrotrope and can simultaneously activate the basal surface of the organoclay and swell the galleries. Typically, the amount of organoclay will make up about 20 to about 75 weight percent of the master batch composition. In some embodiments, the amount of organoclay comprises about 25 to 55 weight percent of the master batch composition and is preferably about 45 to 55 weight percent thereof. The organoclay concentrates can be diluted with additional wax to prepare a final composition useful as a surface coating. The preparation of the concentrates provides the organoclays in a pelletized form, which makes them easier to handle and aids in the rapid and homogeneous dispersion of the organoclay in the wax and wax/polymer melt.

Natural waxes contemplated for use in the practice of the invention include, but are not limited to, paraffin, microcrystalline montan, and vegetable waxes. Examples of synthetic waxes include, but are not limited to, Fisher-Tropsch, polyethylene, polypropylene, polymethylene, chemically modified waxes, and polymerized alpha-olefins. Chemically modified waxes include, e.g. paraffin waxes that have undergone chemical reactions such as adduct formation, cracking reactions, and free radical substitution reactions. Specific examples of suitable semi-crystalline waxes include, but are not limited to polyethylene-block-polyethylene glycol and polyethylene monoalcohol. Combinations of two or more waxes are also contemplated for use in the practice of the invention.

In another aspect of the present invention, the wax nanocomposites are prepared in the form of a water-based emulsion. This is accomplished by adding an emulsion stabilizer to the wax/organoclay composition together with the application of sufficient shear to disperse the wax nanocomposite in a continuous aqueous phase. The dispersed nanocomposite phase comprises at least 1 to 10 volume percent of the emulsion with a maximum of about 45 to 48 volume percent. In some such embodiments, the dispersed nanocomposite phase comprises about 20 to 40 volume percent.

The emulsion stabilizer can be prepared prior to emulsion formation or in situ during emulsion formation by adding a relatively strong basic component to a relatively weak organic acid. Examples of bases used in the preparation of the emulsion stabilizer include, but are not limited to, sodium hydroxide, lithium hydroxide, potassium hydroxide, ammonia, and organic amines. Examples of weak acids used in the preparation of the emulsion stabilizer are, but are not limited to, carboxylic acids having alkyl chain lengths of 5 to 50 carbon atoms. The alkyl chains may be either saturated or unsaturated or contain a combination of both. In addition, the acid may contain more than one acidic functional group. For example, the Diacid® tall oil derivatives sold by Mead-Westvaco are particularly useful. These include dicarboxylic acids and dicarboxylic acids combined with tall oil fatty acids.

The emulsion is prepared by adding the wax nanocomposite melt to the water with sufficient stirring to disperse the wax nanocomposite in the form of fine droplets that range in size between about 0.1 micron to about 10–50 micron. This order of addition will result in an oil-in-water emulsion that has a creamy consistency and a viscosity appropriate for surface coating. The dispersed particle size is small enough to provide resistance from emulsion separation due to gravitational settling. In addition, an emulsion stabilizer such as zirconium carbonate may be used in sufficient concentration to inhibit droplet coalescence.

Alternatively, the nanocomposite emulsion can be prepared by first dispersing the organoclay filter cake in water. The wax melt is then added drop-wise to the water containing the filter cake with sufficient stirring to produce wax droplets that range in size between about 0.1 micron to about 10–50 micron. In this instance, the organoclay acts as the emulsifying surfactant. Additionally, the wax melt may contain surfactants to ensure that a stable oil-in-water emulsion is produced.

The resulting nanocomposite emulsions can be applied as a coating or film on different substrates to provide articles with improved barrier properties to gases, water, water vapor, VOCs and resistance to chemicals. The emulsion can also improve mechanical properties of the substrate like tear, scratch and puncture resistance, tensile strength. Examples of suitable substrates include, but are not limited to, wood, paper, cardboard, metal foils, ferrous and nonferrous metals, etc. Application to metal substrates is intended to provide a barrier for corrosion resistance. The emulsion can be applied to the surface of the substrate by a variety of available coating techniques. Examples of coating techniques include, but are not limited to, blade coating, rod coating, roll coating, jet coating, spray coating, air knife coating, pond size press, film size press, and the like.

In one aspect of the invention, the wax nanocomposite is combined with a polyolefin such as low density polyethylene to improve the strength and flexibility of the wax nanocomposite. These materials have sufficient thermal stability and melt strength to be applied to a substrate by extrusion coating techniques. Other useful polymers include, but are not limited to, linear low density polyethylene, high density polyethylene, ethylene propylene copolymers, elastomers, ethylene copolymers containing one or more of the following functional groups, vinyl alcohol, vinyl acetate, acrylic acid, methacrylic acid, methyl acrylate, ethyl acrylate, butyl acrylate, methyl methacrylate, ethyl methacrylate, maleic anhydride, succinic anhydride.

The wax/polymer ratio may vary from about 50 to about 0.02 or less. The ratio is determined by the properties desired, such as barrier capability, adhesion capability, melt rheology, etc.

To obtain useful nanocomposite properties in wax/polymer mixtures, the organoclay must be compatible with the wax, which in turn must be compatible with the polymer. Compatibility between polymer/wax blends is known from prior art to be a function of the freezing points of the two components. If one component freezes at a significantly higher temperature than the other, the result upon cooling is a phase separated mixture that does not improve the properties of either the wax or the polymer. For example, a paraffin wax that freezes at about 45° C. is not compatible with either low density polyethylene which freezes at about 87° C. or with high density polyethylene which freezes above 100° C. The effect of the organoclay on the recrystallization temperatures of the wax and the polymer must also be considered in the design of a useful nanocomposite system. Melt and shear histories of polymer systems are also important factors. For example, the recrystallization temperature of a polymer can be increased 15–20° C. if the temperature of the polymer melt is insufficient to ensure complete crystal melting or if the polymer melt contains locally entangled segments originating from the polymer crystallites.

The nanocomposites prepared according to the present invention display unexpectedly high barrier capabilities in comparison to previous clay/wax nanocomposites. The nanocomposites disclosed herein can routinely reduce the oxygen permeability of wax coatings by a factor of ten to one hundred or more. At sufficient clay concentrations, the permeability may be reduced by one thousand to ten thousand or more. Combinations of wax nanocomposites with polyolefins can in turn result in significant reductions in gas permeability relative to the pure polymer. Reductions in oxygen permeability of ten to one-hundred fold or more relative to the pure polymer can be achieved with the present invention.

While not wishing to be bound by theory and without limiting the scope of the invention, it is believed that invention methods improve the barrier properties of clay/wax nanocomposites by taking into account the effect of the semi-crystalline structure of polyolefins on nanocomposite morphology and performance. The polyolefins, together with the waxes, consist of a mixture of crystalline and amorphous phases at temperatures above the $T_g$ and below $T_m$. The hydrocarbon chains fold in on themselves to form crystallites which in turn stack upon themselves to form spherulites. The crystallites are generally on the order of 10–20 nm, while the spherulites can be as large as 50–100 microns or larger as in the case of waxes. The crystallites are held together by amorphous polymer segments which contribute to the strength of the material. If the hydrocarbon chain length is shortened sufficiently, as in the case of the waxes, the chains become less and less able to bridge the gap between the crystallites, and the material becomes brittle. Gas diffusion can take place at the interfaces between the crystallites and at the surfaces of the spherulites. Thus, a tortuous diffusion path is an inherent component of all semi-crystalline polymer systems.

During cooling of the wax, if the interaction energy between the organoclay surface and the polymer chains is insufficient to disrupt the normal crystallization process, the organoclay will be pushed aside by the growing polymer crystallites, along with any other impurities that happen to be present in the polymer melt. In fact, there is no prior art showing an increase in barrier properties for any olefin-based nanocomposites, including waxes. In these systems, the addition of organoclays, according to prior art, actually results in a decrease of barrier properties. The lack of significant commercial nanocomposite barrier materials, despite years of research since the first publications in the field (see, e.g., Okada, F., et al., U.S. Pat. No. 4,739,007 (1988)) illustrates just how difficult these problems are to solve.

To overcome these problems, the invention provides for the use of an organophilic clay that promotes the stable dispersion of the clay into a wax. The invention further provides for maintaining the stable dispersion during cooling of the melt by matching the cohesion energies of the organoclay and wax. Thus, it is not sufficient that the wax wet the surface of the organoclay, but the cohesion energy of the organoclay coating must be close to that of the wax crystal phase. In other words, the freezing points of the surfactant chains coating the clay and the wax must be close enough to enable the organoclay to remain in solid solution as the wax freezes. In contrast, where cohesion energies remain unmatched, the clay will not properly disperse. For example, Cloisite 15A (i.e., Cloisite Na treated with 125 meq of dimethyl dihydrogenated tallow amine) produces a brown precipitate when combined with a paraffin wax melt (see Example 1).

The following non-limiting examples serve to further illustrate advantages of the disclosed invention.

EXAMPLE 1

This example illustrates the superior barrier capabilities that can be achieved by dispersing organoclays of the present invention into paraffin wax. An organophilic clay was prepared from a commercially available, water-washed montmorillonite (Cloisite Na® which is a product of Southern Clay Products). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyldiphosphonate added was 3 weight percent relative to the weight of the dry clay. Following equilibration for 30 minutes, the temperature of the slurry was increased to 70° C. and an amount of dimethyl dihydrogenated tallow ammonium chloride (Arquad 2HT-75, a quaternary amine salt commercially available from Akzo Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Also combined with the quaternary amine solution was an antioxidant, Irganox® B225 (a product of Ciba Specialty Chemicals Corp.) at a concentration of 1000 ppm relative to the weight of the organoclay. Mixing of the clay suspension was continued for one hour after all of the quaternary amine salt was added. The suspension was vacuum filtered, redispersed in deionized water at 60° C. and refiltered. The organoclay was dried under vacuum at 70° C. to produce a fine powder with less than 1 weight percent moisture. The basal spacing of the organoclay product, as measured by x-ray diffraction, was approximately 36.5 Å.

Wax nanocomposites with organoclay concentrations of 5, 10, 15, and 20 weight percent were prepared by mixing the organoclay powder into the melted wax with stirring at approximately 80° C. The paraffin used to prepare the samples was purchased from Aldrich Chemical Co. and had a melting point of 52° C. and a recrystallization point of 45.5° C. The wax nanocomposites were applied to a silicone release paper using a smooth coating rod from R. D. Specialties, Inc. The draw-down was done with the paper supported on a glass coating bed also supplied by R. D. Specialties, Inc. The procedure for preparing the nanocomposite coatings is as follows:

1. The sheet of paper to be coated was attached to the glass coating bed by attaching metal clips to the entire perimeter of the paper to prevent curling of the paper during the coating process. The secured paper, the smooth rod, and the paraffin nanocomposite were placed in an oven at 120° C. for a time sufficient to reach thermal equilibration.

2. The coating bed and the rod were removed from the oven and placed on the bench top. Immediately, the wax was removed from the oven and was applied to the top of the paper in the form of a horizontal strip. Immediately, the smooth rod was used to draw down the wax to the bottom of the paper using a steady motion so as to obtain a smooth, defect free film of about 50 microns. No applied pressure was used during the draw down beyond that exerted by the weight of the rod, to assure that the wax coating remained on the surface of the paper and did not penetrate into the paper.

3. The coated sheet of paper was removed from the coating bed and aged at room temperature for at least 24 hours before measuring the oxygen permeability of the wax film.

The oxygen transmission rate was measured on films with thickness of approximately 2 mils. The measured film thickness was used to calculate oxygen permeability from the measured oxygen transmission rate. The results for three different organoclay loadings are shown in Table 1 along with the reference value for zero clay addition. (A control experiment in which 5 weight percent Cloisite 15A was dispersed in the wax showed no reduction in oxygen permeability.) There is a dramatic decrease in oxygen permeability with increasing organoclay concentration until 15 weight percent organoclay loading. Microscopic examination of the film with 15 weight percent organoclay revealed extensive cracking that looked identical to that in the reference film with no added organoclay. With only 5 weight percent organoclay the oxygen permeability dropped by approximately 62 fold, while with 10 weight percent organoclay addition, the oxygen permeability dropped by 330 fold. This performance is well beyond what has been found in nylon nanocomposites where reduction in oxygen permeability of 2–5 fold is found for 2–5 weight percent organoclay loading. See, e.g., A. Usuki, N. Hasegawa, H. Kadoura, and T. Okamoto, Nano Lett, 1, No. 5, 271 (2001). No reduction in oxygen permeability has been reported for wax nanocomposites.

The levels of reduction in gas permeability found in nylon nanocomposites are consistent with a tortuosity mechanism in which the permeability is proportional to clay loading (i.e., Nielsen model). If the gas permeability is limited by diffusion through narrow gaps between the oriented clay platelets, the relative permeability is a function of the aspect ratio ($\alpha$) and the clay loading ($\phi$) as shown in equation (1):

$$P_o/P_c = 1 + \frac{1}{2}\alpha\cdot\phi \qquad (1)$$

where $P_o$ and $P_c$ are the permeability of the pure polymer and the nanocomposite, respectively. In this case the relative permeability is proportional to the clay loading. If the permeability is limited by gas diffusion around impermeable clay platelets, the relative permeability becomes proportional to the square of the clay loading:

$$P_o/P_c = 1 + \alpha^2 \cdot \phi^2/(1-\Phi) \qquad (2)$$

If we attempt to fit the data of Table 1 to the Nielsen equation (Eq. 1) in which the gas permeability is a function of both the volume fraction of the mineral filler and the aspect ratio of the filler platelets, we can calculate an effective aspect ratio for the organoclay platelets in our wax nanocomposites at 5 and 10 weight percent organoclay. The calculated aspect ratios turn out to be approximately 3,000 and 9,500 for 5 weight percent and 10 weight percent clay loading, respectively. These values are well beyond the typical aspect ratios for montmorillonite which are reported to be between 100–500. If, on the other hand, we use Eq 2 to back calculate the effective aspect ratio, we obtain values of 250 and 240 at 5 and 10 weight percent loading, respectively. These values are well within the physically acceptable range of aspect ratios for montmorillonite in nanocomposite systems. Clearly, the mechanism by which the oxygen permeability in the wax nanocomposites is reduced is by a tortuous path in which the permeability is limited by diffusion around the clay platelets as described in Eq 2.

The polarized photomicrograph of the wax nanocomposite in FIG. 1 shows that the presence of the organoclay has a dramatic influence on the crystal structure of the wax. Normally, a significant amount of shrinkage accompanies the melt/freeze transition due to the high degree of crystallinity and the density difference between the amorphous melt and the crystal phases. However, the nanocomposite with 5 weight percent organoclay did not exhibit the shrinkage that normally occurs in neat wax or wax containing conventional organoclays like Cloisite 15A.

Figure 2:
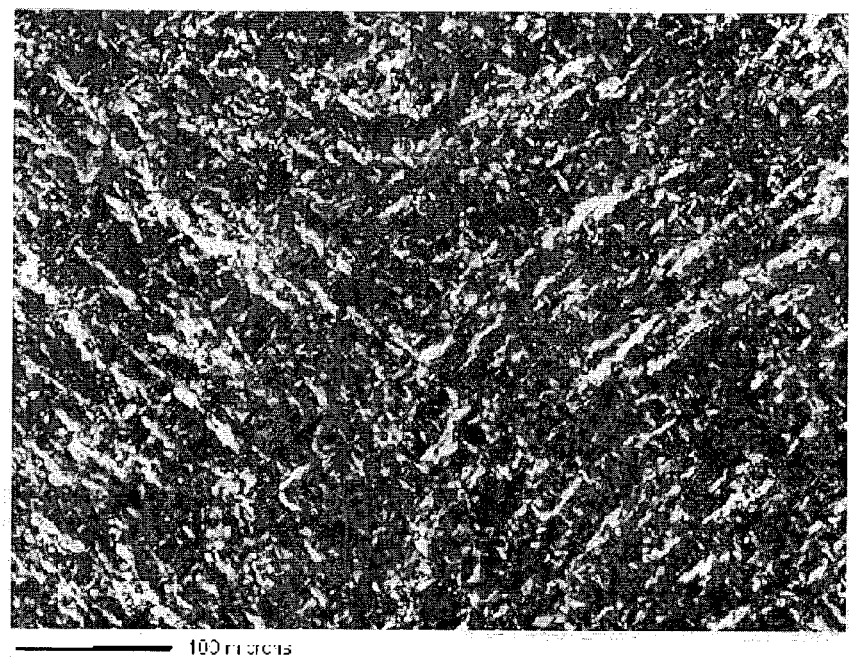
FIG. 2 Polarized light micrograph of clay/wax nanocomposite containing 5 weight percent organoclay showing crystal detail at the spherulite interface.

At low organoclay concentrations, the wax nanocomposites, prepared according to the present invention, produced tightly compacted crystallites which are arranged in the shape of spherulites. The diameter of the spherulites is approximately 500 microns. The normal micro-cracking at the spherulite interfaces is noticeably absent in the nanocomposites of the present invention. In fact, FIG. 2 shows that a distinct boundary between the spherulites is noticeably absent. In other words, the organoclay reduced the shrinkage that normally occurs at the grain boundaries between the wax crystallites and at the interface between the spherulites. The result is a much more densely packed film with fewer structural defects. This effectively reduces grain boundary diffusion at the spherulite interfaces. However, this was not the case with the composites prepared with Cloisite 15A, in which significant tearing within the wax film was evident.

TABLE 1

Oxygen Permeability of clay/wax nanocomposite films.

| Organoclay, Wt % | O$_2$ Permeability* |
|---|---|
| 0 | 4629E−17 |
| 5 | 75E−17 |
| 10 | 14E−17 |
| 15 | 4629E−17 |

*units are mol O$_2$/m · s · Pa

EXAMPLE 2

In this example a wax nanocomposite with high organoclay loading is combined with low density polyethylene to provide flexible cast films. An organophilic clay was prepared as in Example 1 but without the addition of poly (propylene glycol) to the organoclay. Instead, the dry organoclay was combined by melt compounding with an equal weight of polyethylene-block-poly(ethylene glycol) having a hydrophilic lipophilic balance (HLB) value of 4. This in turn was combined by melt compounding with a 50:50 mixture of paraffin wax and low density polyethylene having a melting point of 104–115° C. The organoclay content of the nanocomposite was 21.8 weight percent and the ash content was 13.5 weight percent. Paraffin wax is not compatible with polyethylenes, but in this example the presence of the organoclay in combination with the polyethylene-block-poly(ethylene glycol) prevents phase separation of the paraffin upon cooling from the melt.

When the polyethylene was combined with the wax a defect-free film was obtained by casting onto a paper support using the method described in Example 1. The measured oxygen permeability of the film was $0.5 \times 10^{-17}$ mol O$_2$/m·s·Pa. This represents an approximate 9,000 fold reduction in oxygen permeability relative to the wax reference and 320 fold reduction relative to polyethylene reference. Using Eq. 2 to back calculate an effective aspect ratio assuming a 320 fold reduction in oxygen permeability, we obtain a value of 116. This is lower than the pure paraffin wax system and indicates that the degree of exfoliation of the organoclay is reduced by the presence of the polyethylene.

Figure 3:
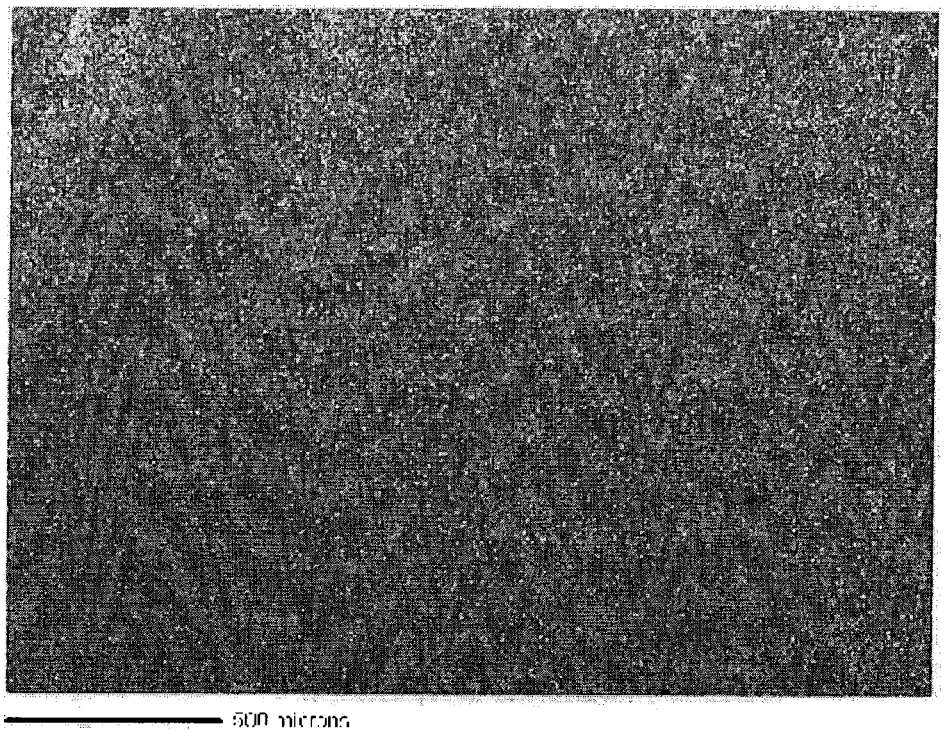
FIG. 3. Polarized light micrograph of the nanocomposite from Example 2.
Figure 4:
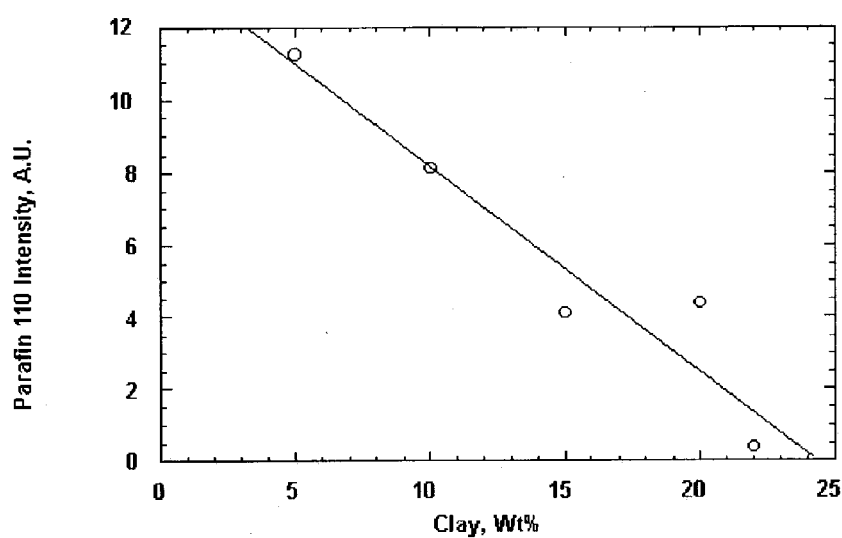
FIG. 4. Plot of paraffin $d_{110}$ diffraction peak intensity as a function of organoclay loading.
Figure 5:
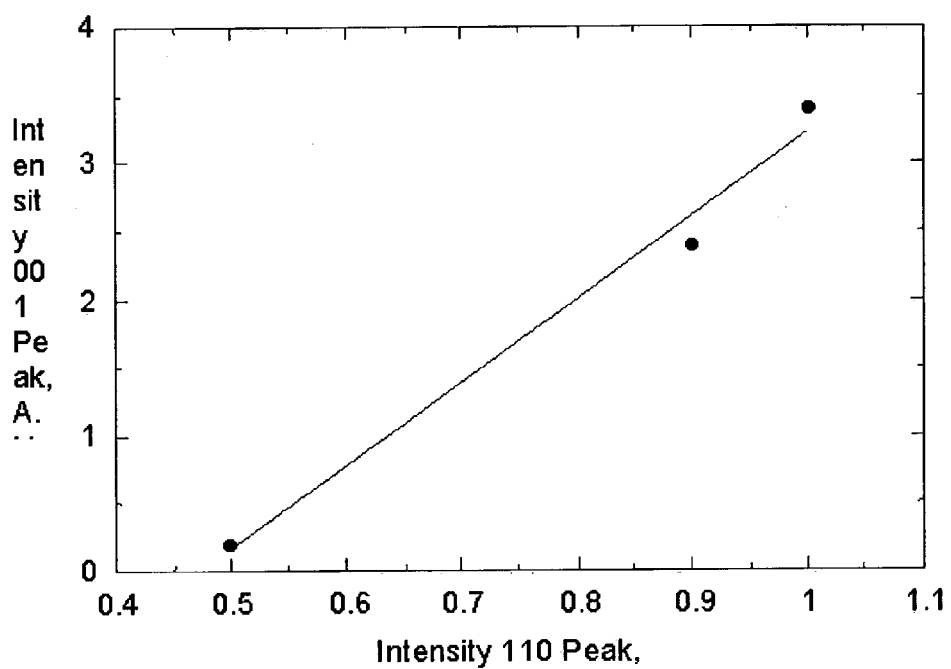
FIG. 5. Plot of organoclay $d_{001}$ diffraction peak intensity as a function of paraffin $d_{110}$ diffraction peak intensity for various organoclay loadings.

The photomicrograph in FIG. 3 shows that the high clay loading has completely inhibited spherulite growth in the nanocomposite. While polarized light microscopy reveals the presence of a crystal phase the degree of crystallinity is significantly reduced. To further understand the mechanism responsible for the unexpectedly high barrier properties, we measured the paraffin crystallinity as a function of organoclay loading by x-ray diffraction. Between the $T_g$ and $T_m$, paraffin wax, like the polyolefins, is a semi-crystalline solid. That is, the crystal phase is in equilibrium with an amorphous phase. The normal 3-D crystal phase exhibits an x-ray diffraction peak at approximately 4.1 Å which corresponds to the $d_{110}$ spacing. We have found a direct correlation between the height of the diffraction peak at 4.1 Å and organoclay loading. This result is shown in FIG. 4. We have also found a direct correlation between the intensity of the $d_{001}$ reflection from the organoclay and the $d_{110}$ reflection from the paraffin crystal phase. This result is shown in FIG. 5 for diffraction data from the cast films used in the permeability measurements.

Because the heat/melt history and the diffraction geometry of the samples remained constant, we believe that it is reasonable to assume that the height of the $d_{110}$ are proportional the mass ratio of crystal/amorphous phases in the wax and the $d_{001}$ x-ray diffraction peaks are proportional the mass ratio of unexfoliated/exfoliated organoclay, respectively. The x-ray data show that as the amount of the wax crystal phase present in the nanocomposite decreases as the degree of organoclay exfoliation increases. In other words, the organoclay inhibits the growth of the wax crystal phase. This would require that the cohesion energies between the wax and organoclay crystal phases be approximately equal in order for the organoclay to inhibit normal 3-D crystal formation The fact that DSC measurements show melt transitions at 50–55° C. for both pure phases suggests that this is in fact the case.

Figure 6:
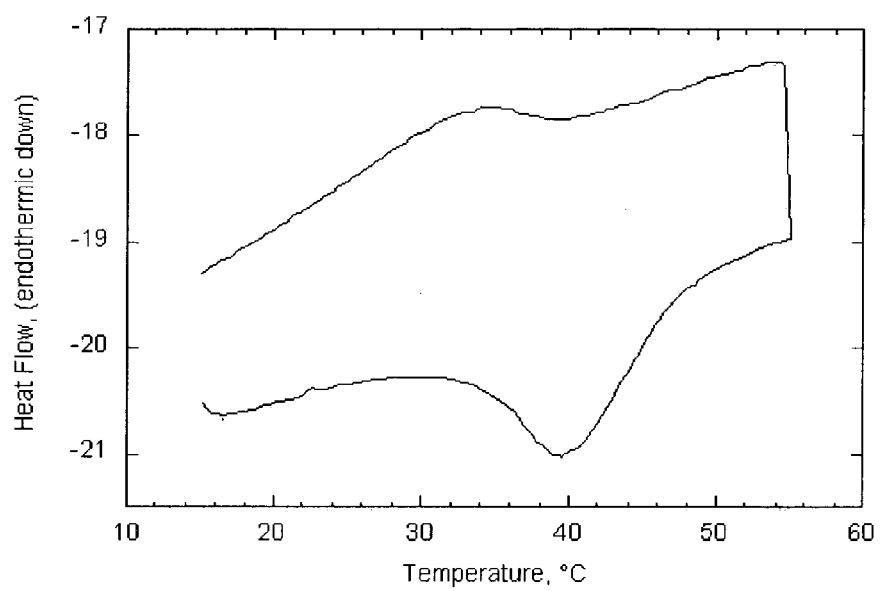
FIG. 6. Plot of relative oxygen permeability ($P/P_0$) as a function of clay loading expressed as $1/(\text{weight percent ash})^2$.

Even more importantly, the freezing points of the organoclay and the wax or polymer need to be close to enable the organoclay to remain in solid solution after the freezing of the matrix takes place. The DSC data in FIG. 6 show the peak of the melt and freeze transitions of the organoclay which occur at 39.6° and 34.4° C., respectively. The DSC measurements of the paraffin wax show peak melt and freeze transitions at 56.2° and 45.5° C., respectively. However, the end of the transition for the wax overlaps with the beginning of the freeze transition of the organoclay. Thus, the solid state cohesion energies of the two are well matched. Mismatch would lead to phase separation between the organoclay and the wax while producing grain boundary defects that would allow rapid gas diffusion. The fact that the barrier data fit Eq. 2 indicates that the bond between the organoclay surface and the paraffin is quite strong with minimal grain boundary defects.

EXAMPLE 3

This example shows the effect of wax melt/freeze point on barrier properties. The organoclay filter cake of Example 1 was dispersed in a high melting wax (Paraflint H1 from Moore & Munger, Inc.) at 100° C. to flush the water from the filter cake. The final organoclay concentration was 10 weight percent. Films were cast on paper and oxygen transmission rate was measured. For the nanocomposite and the pure wax. A second nanocomposite was prepared by adding 10 weight percent LDPE to the wax nanocomposite.

The oxygen permeabilities are reported in Table 2. In this case the reduction in gas transport is less effective than in Example 1 due to the greater difference in freezing points of the wax and the organoclay. The Paraflint H1 has a softening point of 104° C. and a recrystallization transition that begins at about 95° C. As the difference in the freezing points widens, the ability of the organoclay to reduce gas transmission is reduced. A 10 weight percent clay loading reduced the oxygen permeability by only 30% compared to a 99.7% reduction in the paraffin system. Adding a small amount of LDPE improved the barrier performance. The reduction in gas permeability relative to the pure clay was 98.9% and relative to pure LDPE was 78%. The latter result represents a 4.5 fold reduction.

TABLE 2

Oxygen Permeability of Clay/Wax Nanocomposite Films.

| Organoclay, Wt % | O₂ Permeability* |
| --- | --- |
| 0 | 3404E-17 |
| 10 | 2393E-17 |
| 9 | 35E-17** |

*units are mol $O_2$/m · s · Pa
**10 weight percent nanocomposite compounded with 10 weight percent LDPE

EXAMPLE 4

Figure 7:
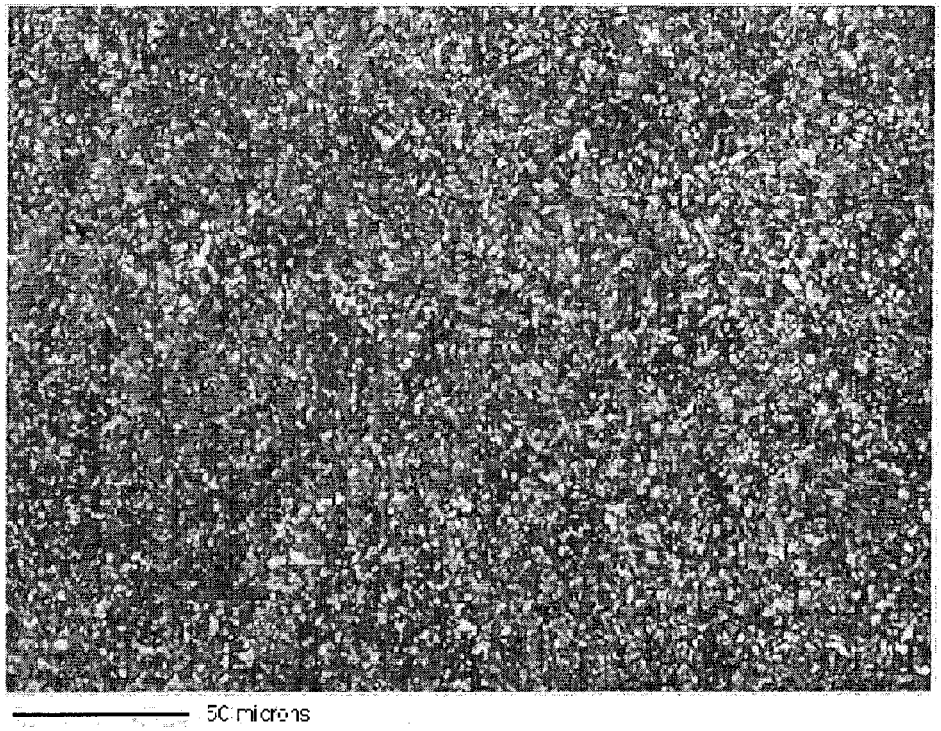
FIG. 7. Polarized light micrograph of the nanocomposite from Example 3 showing the lack of wax spherulites.

This example illustrates the compatibility of the wax nanocomposites with a polyethylene copolymer to provide flexibility in cast films. The organoclay was prepared as in Example 1 and was dispersed in a mixture of paraffin wax and ethylene vinyl acetate (EVA). The nanocomposite contained 10 weight percent organoclay, 5 weight percent EVA and 85 weight percent paraffin wax with a melting point of 50–55° C. The EVA contained 28 weight percent vinyl acetate and is compatible with the paraffin wax. EVA wax blends are commonly used in hot melt adhesive formulations and in certain wax formulations for coating paper boxes. The nanocomposite was prepared by dispersing the organoclay in the melted wax with stirring and then adding the EVA. The result was a dark green nanocomposite which, when cast onto Kraft paper, provided an oil and water resistant film. The photomicrograph of the nanocomposite in FIG. 7 shows that the combination of the organoclay and the EVA prevented the growth of wax spherulites.

EXAMPLE 5

This example illustrates the procedure to prepare an oil-in-water emulsion of wax/clay nanocomposite. Preparation of the organoclay used in this procedure is described in Example 1. The organoclay is used in the form of a filter cake containing about 40% solids and 60% water. The paraffin wax used in the preparation of the wax/clay nanocomposite emulsion has a melting point of 50–55° C. and is supplied by Sigma-Aldrich.

The preparation of the wax emulsion is based on the following formulation:

| COMPOUND | PARTS |
| --- | --- |
| Paraffin Wax | 32.83 |
| Organoclay | 1.73 |
| Irganox B225 | 0.069 |
| Diacid ® 1500 | 5.90 |
| Diacid ® 1525 | 1.90 |
| Water | 55.24 |
| NH₄OH (conc.) | 1.71 |
| TOTAL | 100 |

The ammonium hydroxide is pre-mixed with 10 g of water, which also must be taken into account in calculating the final water content.

To prepare the nanocomposite the paraffin wax was first melted at 100° C. The antioxidant was added to the wax melt with stirring. The organoclay cake was then added into the wax vortex and stirred until all the water was evaporated. When complete water evaporation was achieved, the wax/clay nanocomposite acquired a green color—an indication of complete dispersion and wetting of the organoclay in the wax. Higher concentrations of organoclay produce a deeper green color. The Diacid® surfactants were pre-mixed and then added to the wax/clay nanocomposite with stirring.

An excess of ammonium hydroxide (10 weight percent) was added to the correct amount of boiling water. Addition was fast to minimize evaporation of the ammonium hydroxide. Immediately after the ammonia addition was completed, the melted wax/clay nanocomposite was incorporated. Addition of the wax/clay nanocomposite was steady and fast to minimize ammonia boil-out, but slow enough that it gave time to form the ammonia salt of the surfactants. The emulsion was removed from the heat and stirred until no ammonia odor was detected (about 2 minutes). The emulsion was cooled to room temperature and had a creamy consistency with a slight brown color from the surfactants.

Wax nanocomposite emulsion samples were prepared using paraffin wax containing 5% organoclay. The preparation of the samples was using the same procedure. The type of surfactant used in the paraffin wax was varied and ammonium zirconium carbonate was used to crosslink the carboxylic acid groups. A second wax nanocomposite was prepared using a commercially available wax with a melting point of 110° C. The commercial wax had surfactants in its original formulation; thus a different order of addition was followed (given in Steps 1–3 below) to avoid a reverse emulsion. The high viscosity of the commercial wax made it impossible to add 5% organoclay. Instead, an emulsion containing 2.5% organoclay was produced.

The preparation of the commercial wax nanocomposite is as follows:
1. The commercial wax was melted in an oven at 110° C.
2. The organoclay cake was added to enough boiling water to produce a final wax emulsion with solids concentration of 40%. Addition of the organoclay filter cake was done while stirring at 1200 rpm until full dispersion was achieved—approximately two minutes.
3. The wax melt was added into the boiling water vortex at a rate that allowed time for emulsification to occur but avoided freezing of the wax.

The preparation of the coated samples was as follows:
1. The substrate material was unbleached 42# Kraft paper cut into 6×6 in sheets.
2. Emulsions were applied at room temperature using a smooth rod and a flat glass bed.
3. Coated sheets were placed in an oven at 110° C. for 30 seconds for drying then aged overnight.

Water absorbency and contact angle tests were measured by a commercial laboratory several days after sample preparation. Oil resistance was measured six weeks after sample preparation. Water absorbency, contact angle and oil resistance were measured in all samples according to TAPPI methods T 441 om-98, T 558 om-97 and T559 pm-96 respectively. The results of the testing are presented in Table 3.

| COMPOUND | PARTS |
|---|---|
| Paraffin Wax | 32.8 |
| Organoclay (dry basis) | 1.73 |
| Westvaco Diacid 1500 | 5.90 |
| Westvaco Diacid 1525 | 1.90 |
| Water | 55.98 |
| NH$_4$OH (conc.) | 1.71 |
| TOTAL | 100 |

The organoclay used is in the form of a filter cake containing 35% solids (65% water). The water in the cake was taken into account to maintain water balance.

The preparation of the wax/clay nanocomposite is as follows: The organoclay filter cake was added to the wax melt and stirred until dispersion of the clay was complete, about 1 minute. Both Westvaco surfactants were pre-mixed in the water together with the ammonium hydroxide. A slight excess (10%) of ammonium hydroxide was used to compensate for ammonia evaporation during the mixing operation. Immediately after dissolution of the diacids, the wax melt containing the organoclay was added to the aqueous phase with stirring. The wax addition was done in a slow but constant manner to ensure complete dispersion of the wax. After stirring for about 1 minute, the emulsion was removed from the heat source and allowed to cool to room tempera-

TABLE 3

Water absorbency, contact angle and oil resistance of 42# unbleached Kraft paper, coated with wax nanocomposite emulsions.

| Sample ID | Wax Type | Film Thickness Microns | Organo-clay % | Diacid 1500 wt % | Diacid 1525 wt % | COOH crosslink with Zr Mol % | Water Absorption g water/m$^2$ | Dynamic Contact Angle | | | | Oil Resistance Kit # |
|---|---|---|---|---|---|---|---|---|---|---|---|---|
| | | | | | | | | Initial Angle of Contact deg | | Rate of Wettability deg/sec | | |
| | | | | | | | | Avg. | S.D. | Avg. | S.D. | |
| A | Paraffin | 2.5 | 5 | 6.11 | 1.96 | 0 | 14.00 | 97.65 | 0.39 | 0.03 | 0.00 | 10 |
| B | Paraffin | 2.5 | 5 | 0 | 6.23 | 0 | 24.10 | 105.10 | 2.68 | 0.03 | 0.01 | 10 |
| C | Commercial | 2.5 | 0 | 0 | 0 | 0 | 36.20 | 103.91 | 0.56 | 0.21 | 0.01 | 7 |
| D | Commercial | 2.5 | 2.5 | 0 | 0 | 0 | 36.30 | 100.13 | 4.05 | 0.21 | 0.03 | 12 |
| E | Paraffin | 2.5 | 5 | 6.11 | 1.96 | 10 | 12.90 | — | — | — | — | 8 |
| F | Paraffin | 2.5 | 5 | 0 | 6.23 | 10 | 23.00 | — | — | — | — | 8 |
| G | Paraffin | 2.5 | 5 | 6.11 | 1.96 | 20 | 19.70 | 108.07 | 1.58 | 0.02 | 0.00 | 8 |
| H | Paraffin | 2.5 | 5 | 0 | 6.23 | 20 | 20.20 | — | — | — | — | 8 |

EXAMPLE 6

This example illustrates the preparation of a water-based emulsion in which the organoclay filter cake is dispersed in the wax melt directly without drying. The water from the filter cake is allowed to become part of the oil-in-water emulsion, thereby saving the cost of organoclay drying. The organoclay was prepared as in Example 1 except that the organoclay is used in the form of a filter cake containing about 35% solids and 65% water.

The paraffin wax used in the preparation of the wax/clay nanocomposite emulsion has a melting point of 50–55° C. and is sold by Sigma-Aldrich.

The preparation of the wax emulsion is based on the following formulation:

ture. The resulting stable emulsion had a creamy consistency indicating complete dispersion of the wax phase.

The emulsion was coated onto 42# Kraft paper with a smooth rod using the procedure in Example 3. The water absorbency was measured and found to be 17 g/m$^2$.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While preferred embodiments have been illustrated and described, it should be understood that changes and modifications can be made therein in accordance with ordinary skill in the art without departing from the invention in its broader aspects as defined in the following claims.

What is claimed is:

1. A method of preparing a nanocomposite comprising combining a surface-treated organophilic clay and a melt comprising a wax or wax and polymer, wherein the cohesion energies of the organophilic clay and the wax or wax and polymer are sufficiently matched in both the melt and solid states to produce and maintain a homogenous dispersion of the organophilic clay in both the liquid and solid nanocomposite, and further wherein the surface-treated organophillic clay comprises an anionic edge modifying surfactant adsorbed onto an edge thereof.

2. The method according to claim 1, wherein the organophilic clay is a phyllosilicate.

3. The method according to claim 1, wherein the organophilic clay is a smectite or mica.

4. The method according to claim 1, wherein the organophilic clay is a smectite selected from the group consisting of montmorillonite, hectorite, saponite, sauconite, beidellite, nontronite, synthetic smectite, and combinations of two or more thereof.

5. The method according to claim 1, wherein the wax is selected from the group consisting of paraffin, microcrystalline montan, vegetable waxes, Fisher-Tropsch, polyethylene, polypropylene, polymethylene, chemically modified waxes, polymerized alpha-olefins and combinations of two or more thereof.

6. The method according to claim 5, wherein the wax is polyethylene-block-polyethylene glycol or polyethylene monoalcohol.

7. The method according to claim 1, wherein the surface-treated clay comprises about 20 to about 75 weight percent of the nanocomposite.

8. The method of claim 1, wherein the surface-treated clay comprises about 25 to 55 weight percent of the nanocomposite.

9. The method of claim 1, wherein the surface-treated clay comprises about 45 to 55 weight percent of the nanocomposite.

10. The method according to claim 1, wherein the surface-treated clay includes a nonionic polymeric hydrotrope adsorbed onto a basal surface thereof.

11. The method according to claim 10, wherein the melt comprises from about 1 to about 99 weight percent of the nanocomposite.

12. The method according to claim 11, wherein the surface-treated clay comprises from about 1 to about 15 weight percent of the nanocompo site.

13. The method according to claim 11, wherein the surface-treated clay comprises from about 3 to about 10 weight percent of the nanocomposite.

14. The method according to claim 11, wherein the wax is selected from the group consisting of paraffin, microcrystalline montan, vegetable waxes, Fisher-Tropsch waxes, polyethylene, polypropylene, polymethylene, chemically modified waxes, polymerized alpha-olefins and combinations of two or more thereof.

15. A method for preparing a nanocomposite coating comprising applying a nanocomposite prepared by the method of claim 10 to a substrate to form a coating of the nanocomposite on the substrate.

16. The method according to claim 10, wherein the melt comprises a wax and polymer, and the wax/polymer ratio is from about 50 to about 0.02.

17. The method according to claim 16, wherein the polymer is selected from the group consisting of low density polyethylene, linear low density polyethylene, high density polyethylene, ethylene propylene copolymers, elastomers, and ethylene copolymers, optionally containing one or more functional groups selected from the group consisting of vinyl alcohol, vinyl acetate, acrylic acid, methacrylic acid, methyl acrylate, ethyl acrylate, butyl acrylate, methyl methacrylate, ethyl methacrylate, maleic anhydride, and succinic anhydride.

18. A method for preparing a nanocomposite coating comprising applying a nanocomposite prepared by the method of claim 16 to a substrate to form a coating of the nanocomposite on the substrate.

19. An article comprising a substrate coated with a nanocomposite wherein the coating was prepared according to the method of claim 18.

20. The method according to claim 1, wherein the surface-treated clay is combined with the melt as a slurry.

21. The method according to claim 1, wherein the surface-treated clay is combined with the melt under pressure less than or greater than atmospheric pressure.

22. The method according to claim 1, further comprising incorporating one or more additives into the nanocomposite.

23. The method according to claim 22, wherein the additives are selected from the group consisting of antioxidants, anticorrosion agents, reactive scavengers, UV stabilizers, and colorants.

24. The method according to claim 1, further comprising incorporating one or more organic peroxides into the nanocomposite and reacting at a suitable temperature to effect crosslinking therein.

25. A method for preparing an emulsion comprising mixing a nanocomposite melt prepared according to claim 1 and an aqueous phase with sufficient shear to produce an emulsion, wherein the aqueous phase contains at least one surfactant capable of stabilizing the nanocomposite as an emulsion.

26. The method according to claim 25, further comprising preparing the surfactant in situ by combining a strong base with a weak organic acid.

27. The method according to claim 26, wherein the base is selected from the group consisting of potassium hydroxide, ammonia and organoamines.

28. The method according to claim 27, wherein the acid is a carboxylic acid.

29. The method according to claim 28, wherein the carboxylic acid is a dicarboxylic acid.

30. A method for preparing a nanocomposite coating comprising applying an emulsion prepared by the method of claim 25 to a substrate to form a coating of the nanocomposite on the substrate.

31. An article comprising a substrate coated with a nanocomposite, wherein the coating was prepared by the method of claim 30.

32. A method for preparing an emulsion comprising mixing a nanocomposite melt and an aqueous phase with sufficient shear to produce an emulsion, wherein the aqueous phase contains at least one surfactant capable of stabilizing the nanocomposite as an emulsion, wherein the nanocomposite melt is prepared by combining an organophilic clay and a melt comprising a wax or wax and polymer, wherein the cohesion energies of the organophilic clay and the wax or wax and polymer are sufficiently matched in both the melt and solid states to produce and maintain a homogenous dispersion of the organophilic clay in both the liquid and solid nanocomposite; and the surfactant is prepared in situ by combining a strong base with a weak organic acid; wherein the base is selected from the group consisting of potassium hydroxide, ammonia and organoamines; and the acid is a carboxylic acid.

33. The method of claim 32 wherein the acid is a dicarboxylic acid.

* * * * *